US011660479B2

(12) United States Patent
Yamamoto et al.

(10) Patent No.: US 11,660,479 B2
(45) Date of Patent: May 30, 2023

(54) INTERNAL PRESSURE ADJUSTMENT OF A ROBOT

(71) Applicant: KABUSHIKI KAISHA YASKAWA DENKI, Kitakyushu (JP)

(72) Inventors: Hidehiro Yamamoto, Fukuoka (JP); Shunichiro Ninomiya, Fukuoka (JP); Hiroki Shimpo, Fukuoka (JP); Tsuyoshi Ito, Fukuoka (JP)

(*) Notice: Subject to any disclaimer, the term of this patent is extended or adjusted under 35 U.S.C. 154(b) by 407 days.

(21) Appl. No.: 16/809,564

(22) Filed: Mar. 5, 2020

(65) Prior Publication Data
US 2020/0282557 A1 Sep. 10, 2020

(30) Foreign Application Priority Data

Mar. 7, 2019 (JP) .............................. JP2019-041411

(51) Int. Cl.
B25J 19/00 (2006.01)
A62C 2/04 (2006.01)
B25J 9/16 (2006.01)

(52) U.S. Cl.
CPC ............... *A62C 2/04* (2013.01); *B25J 9/1633* (2013.01); *B25J 19/0079* (2013.01)

(58) Field of Classification Search
CPC ........... B25J 19/0079; A62C 2/00; A62C 2/04
See application file for complete search history.

(56) References Cited

U.S. PATENT DOCUMENTS

| 4,802,815 A * | 2/1989 | Funabashi | ............ | B25J 19/0079 |
| | | | | 901/15 |
| 5,146,105 A * | 9/1992 | Obata | ................... | B25J 19/0079 |
| | | | | 307/118 |
| 7,915,773 B2 * | 3/2011 | Takahashi | ............... | H02K 5/136 |
| | | | | 310/83 |
| 8,667,926 B2 * | 3/2014 | Takahashi | ............ | B25J 19/0079 |
| | | | | 118/321 |
| 2008/0287050 A1 | 11/2008 | Krogedal et al. | | |

FOREIGN PATENT DOCUMENTS

| DE | 102014109731 | 1/2016 |
| EP | 2463066 | 6/2012 |
| JP | S62-162494 | 7/1987 |
| JP | S63-064492 | 4/1988 |
| JP | H9-168991 | 6/1997 |

(Continued)

OTHER PUBLICATIONS

Extended Search Report in corresponding European Application No. 20161124.1, dated Jul. 31, 2020.

(Continued)

*Primary Examiner* — William C Joyce
(74) *Attorney, Agent, or Firm* — SOEI Patent & Law Firm

(57) ABSTRACT

An internal pressure adjustment system includes a gas supply line that supplies incombustible gas to a housing space of a robot, and an exhaust line that exhausts gas from the housing space. The internal pressure adjustment system further includes an on-off valve of a gas pressure driven type that switches between opening and closing of the exhaust line in accordance with the gas supply pressure. The exhaust line is opened in response to an increase in the gas supply pressure and the exhaust line is closed in response to a decrease in the gas supply pressure.

20 Claims, 6 Drawing Sheets

(56) References Cited

FOREIGN PATENT DOCUMENTS

JP  2006-326726  12/2006
JP  4496541  7/2010

OTHER PUBLICATIONS

Office Action issued in Japanese Patent Application No. P2019-041411, dated Dec. 1, 2020 (with English partial translation).
Office Action issued in European Patent Application No. 20161124.1, dated Apr. 6, 2023.

* cited by examiner

INTERNAL PRESSURE ADJUSTMENT OF A ROBOT

CROSS-REFERENCE TO RELATED APPLICATION

This application is based upon and claims the benefit of priority from Japanese Patent Application No. 2019-041411, filed on Mar. 7, 2019, the entire contents of which are incorporated herein by reference.

BACKGROUND

Japanese Patent No. 4494541 discloses an internal pressure explosion-proof system that includes an internal pressure explosion-proof manipulator having an airtight chamber therein, a gas supply line that supplies air to the airtight chamber, and a gas exhaust line that seals or releases the air supplied to the airtight chamber. This internal pressure explosion-proof system includes a first timer that measures scavenging preparation time from when the gas supply line starts supplying the air while the gas exhaust line seals the air, and a second timer that measures scavenging time from when the gas exhaust line starts releasing the air after the scavenging preparation time has elapsed. When the second timer counts a predetermined period of time, it is determined that scavenging has been completed.

SUMMARY

An example internal pressure adjustment system disclosed herein may include a gas supply line configured to supply incombustible gas to an internal space of a robot and an exhaust line configured to exhaust gas from the internal space. The internal pressure adjustment system may further include a gas pressure driven on-off valve configured to switch between opening and closing of the exhaust line in accordance with the gas supply pressure. In some examples, the exhaust line is opened in response to an increase in the gas supply pressure, and the exhaust line is closed in response to a decrease in the gas supply pressure.

An example robot system is also disclosed herein. The robot system may include the above-described internal pressure adjustment system and a robot.

An example internal pressure adjustment method is also disclosed herein. The method may include changing a gas supply pressure from a gas supply line to an internal space of a robot, the gas supply line being configured to supply incombustible gas, and detecting a pressure abnormality in the internal space, based on a gas flow rate in the exhaust line. In some examples, gas is exhausted from the internal space in response to an increase in the gas supply pressure, and the exhausting of gas from the internal space is prohibited or terminated in response to a decrease in the gas supply pressure.

DETAILED DESCRIPTION

Figure 1:
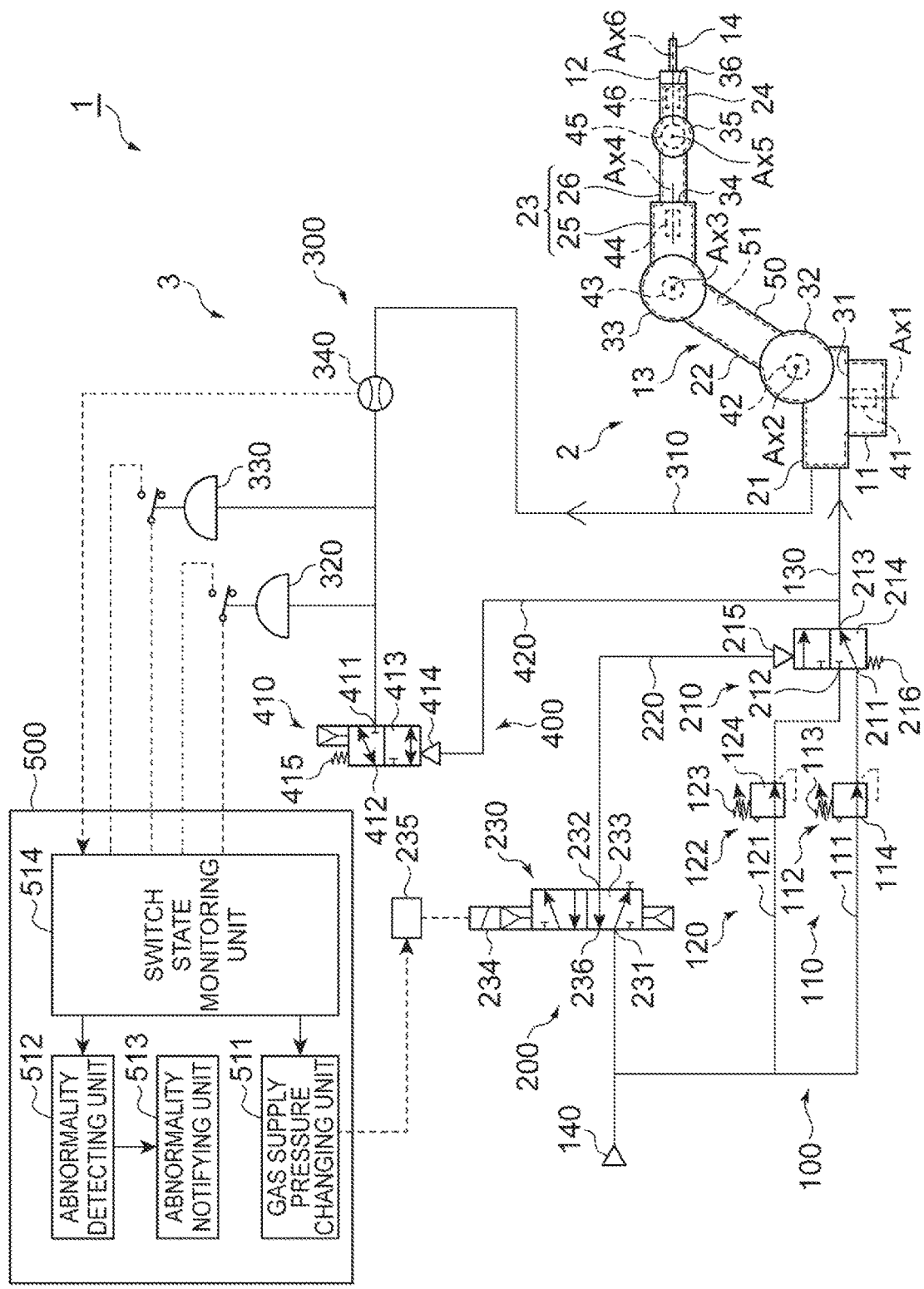
FIG. 1 is a schematic diagram illustrating an example schematic configuration of a robot system.

Hereinafter, with reference to the drawings, the same elements or similar elements having the same function are denoted by the same reference numerals, and redundant description will be omitted.

Robot System

A robot system 1 for operating a robot 2 is illustrated in FIG. 1. In some examples, the robot 2 may be configured to work in an atmosphere containing combustible gas. Examples of the work include, but are not limited to, painting using a paint that generates combustible gas, and other types of work that are executed in an atmosphere containing combustible gas.

The robot system 1 includes the robot 2, which may be of an internal pressure explosion-proof type robot, and an internal pressure adjustment system 3. The robot 2 has a housing space 51 (internal space) of a motor or other component that can serve as an ignition source. In some examples, an internal pressure within the housing space 51 may be maintained at a higher pressure than a pressure outside the housing space 51. The internal pressure adjustment system 3 may be configured to maintain and/or control the pressure in the housing space by supplying incombustible gas into the housing space 51. Hereinafter, example configurations of the robot 2 and the internal pressure adjustment system 3 will be described in additional detail.

Robot

The robot 2 may comprise a six-axis vertical articulated robot including a base portion 11, a distal end portion 12, an articulated arm 13, a painting tool 14, and an outer shell 50. In a work area for the robot 2, the base portion 11 is installed on, for example, a floor surface.

The articulated arm 13 connects the base portion 11 and the distal end portion 12. The articulated arm 13 includes a plurality of joints 31, 32, 33, 34, 35, and 36, and is configured to change a position and posture of the distal end portion 12 with respect to the base portion 11 by changing angles of the plurality of joints 31, 32, 33, 34, 35, and 36. For example, the articulated arm 13 includes a turning unit 21, a lower arm 22, an upper arm 23, a wrist unit 24, and a plurality of motors 41, 42, 43, 44, 45, and 46.

The turning unit 21 is provided on an upper part of the base portion 11 so as to be able to turn around an axis Ax1 that is vertical. In some examples, the articulated arm 13 includes a joint 31 that allows the turning unit 21 to turn around the axis Ax1.

The lower arm 22 is connected to the turning unit 21 so as to be swingable around an axis Ax2 intersecting (for example, orthogonally) with the axis Ax1. In some examples, the articulated arm 13 includes a joint 32 that allows the lower arm 22 to swing around the axis Ax2. Note that the term "intersecting" as used herein may be understood as referring to intersecting in which the axis Ax1 and the axis Ax2 are in a twisted relationship with each other like a so-called three-dimensional intersection.

The upper arm 23 is connected to the end of the lower arm 22 so as to be swingable around an axis Ax3 intersecting with the axis Ax1. In some examples, the articulated arm 13 includes a joint 33 that allows the upper arm 23 to swing around the axis Ax3. The axis Ax3 may be parallel to the axis Ax2.

A distal end portion 26 of the upper arm 23 can turn around an axis Ax4 along the center of the upper arm 23. In some examples, the articulated arm 13 includes a joint 34 that allows the distal end portion 26 of the upper arm 23 to turn around the axis Ax4. For example, the distal end portion 26 of the upper arm 23 can turn with respect to a base portion 25.

The wrist unit 24 is connected to the distal end portion 26 of the upper arm 23 so as to be swingable around an axis Ax5 intersecting (for example, orthogonally) with the axis Ax4. In some examples, the articulated arm 13 includes a joint 35 that allows the wrist unit 24 to swing around the axis Ax5.

The distal end portion 12 is connected to a distal end portion of the wrist unit 24 so as to be able to turn around an axis Ax6 along the center of the wrist unit 24. In some examples, the articulated arm 13 includes a joint 36 that allows the distal end portion 12 to turn around the axis Ax6.

The plurality of motors 41, 42, 43, 44, 45, and 46 are configured to drive a plurality of movable portions of the articulated arm 13 in accordance with the supply of electric power. For example, the motor 41 is configured to turn the turning unit 21 around the axis Ax1, the motor 42 is configured to swing the lower arm 22 around the axis Ax1, and the motor 43 is configured to swing the upper arm 23 around the axis Ax3. Additionally, the motor 44 is configured to turn the distal end portion 26 of the upper arm 23 around the axis Ax4, the motor 45 is configured to swing the wrist unit 24 around the axis Ax5, and the motor 46 is configured to turn the distal end portion 12 around the axis Ax6. In some examples, the plurality of motors 41, 42, 43, 44, 45, and 46 are configured to drive the plurality of joints 31, 32, 33, 34, 35, and 36, respectively.

The painting tool 14 is attached to the distal end portion 12 and is configured to discharge paint onto a workpiece. A liquid supply line is connected to the painting tool 14, and the paint is pressure-fed to the painting tool 14 through the liquid supply line.

The outer shell 50 covers the plurality of motors 41, 42, 43, 44, 45, and 46 that can be ignition sources, and isolates the housing space 51 of the plurality of motors 41, 42, 43, 44, 45, and 46 from an external space of the housing space 51.

In addition to the example configurations described and illustrated with respect to FIG. 1, the robot 2 may be configured in other arrangements in which the position and posture of the distal end portion 12 with respect to the base portion 11 can be adjusted. For example, the robot 2 may be a seven-axis robot in which a redundant axis is added to the six-axis vertical articulated robot. Furthermore, the robot 2 may be a so-called scalar type robot.

Internal Pressure Adjustment System

The internal pressure adjustment system 3 may be configured to maintain the pressure in the housing space 51 at a pressure higher than the pressure outside the housing space 51 by supplying incombustible gas to the housing space 51 (internal space) of the robot 2. Under normal conditions in which the robot 2 is operating, the internal pressure adjustment system 3 may be configured to maintain the pressure in the housing space 51 at a pressure that is higher than the pressure outside the housing space 51. Additionally, the internal pressure adjustment system 3 may be configured to perform a scavenging operation that replaces gas in the housing space 51 with the incombustible gas before the operation of the robot 2, such as when the system is first started or initiated. In some examples, the internal pressure adjustment system 3 includes a gas supply line 100, a gas supply pressure changing unit 200, an exhaust line 300, an opening/closing unit 400, and an internal pressure controller 500.

The gas supply line 100 is configured to supply the incombustible gas to the housing space 51 of the robot 2. For example, the gas supply line 100 includes a first gas supply line 110, a second gas supply line 120, and a connection line 130.

The first gas supply line 110 is configured to supply the incombustible gas at a normal pressure preset for the normal operation (for operating the robot 2). For example, the first gas supply line 110 includes a first gas supply line 111 and a first pressure reducing valve 112. The first gas supply line 111 is connected to a gas supply source 140 (an incombustible gas source) of the incombustible gas and guides the incombustible gas from a side of the gas supply source 140 to a side of the robot 2. The first pressure reducing valve 112 is provided in the first gas supply line 111 and maintains a pressure on the side of the robot 2 side in the vicinity of the normal pressure by adjusting an opening degree or flow rate of a flow path of the incombustible gas. The first pressure reducing valve 112 is a non-electrically driven regulator and includes a valve member 114 and a repulsion member 113 such as a pressure regulating spring. The valve member 114 is configured to change the opening degree of the flow path of the incombustible gas in accordance with the pressure on the side of the robot 2. The repulsion member 113 gives the valve member 114 a closing force, or repulsive force, which is adjusted in advance so that the pressure on the side of the robot 2 is maintained in the vicinity of the normal pressure.

The second gas supply line 120 is configured to supply the incombustible gas at a scavenging pressure preset for the scavenging operation. The scavenging pressure is set to be higher than the normal pressure. For example, the second gas supply line 120 includes a second gas supply line 121 and a second pressure reducing valve 122. The second gas supply line 121 is connected to the gas supply source 140 and guides the incombustible gas from the side of the gas supply source 140 to the side of the robot 2. The second pressure reducing valve 122 is provided in the second gas supply line 121 and is configured to maintain the pressure on the side of the robot 2 in the vicinity of the scavenging pressure by adjusting the opening degree or flow rate of the flow path of the incombustible gas. The second pressure reducing valve 122 is a non-electrically driven regulator and includes a valve member 124 and a repulsion member 123 such as a pressure regulating spring. The valve member 124 is configured to change the opening degree of the flow path of the incombustible gas in accordance with the pressure on the side of the robot 2. The repulsion member 123 is configured to give the valve member 124 a closing force, or repulsive force, which is adjusted in advance so that the pressure on the side of the robot 2 is maintained in the vicinity of the scavenging pressure.

The connection line 130 is interposed between the first gas supply line 110 and the second gas supply line 120 and the robot 2 and is configured to send the incombustible gas to the housing space 51.

The gas supply pressure changing unit 200 is configured to change the gas supply pressure of the incombustible gas by the gas supply line 100. For example, the gas supply pressure changing unit 200 is configured to change the gas supply pressure between the normal pressure and the scavenging pressure. As an example, the gas supply pressure changing unit 200 includes a switching valve 210, a pressurizing line 220, and a drive valve 230.

The switching valve 210 is configured to switch between a first gas supply state and a second gas supply state. In the first gas supply state, the incombustible gas is supplied to the housing space 51 by the first gas supply line 110. In the second gas supply state, the incombustible gas is supplied to the housing space 51 by the second gas supply line 120. For example, the switching valve 210 is of a non-electrically driven and gas pressure driven type that is driven by a gas pressure. In the first gas supply state, the switching valve 210 is configured to disconnect the second gas supply line 121 from the connection line 130, and to connect or fluidly couple the first gas supply line 111 to the connection line 130. In the second gas supply state, the switching valve 210 is configured to disconnect the first gas supply line 111 from the connection line 130, and to connect or fluidly couple the second gas supply line 121 to the connection line 130.

In some examples, the switching valve 210 includes ports 211, 212, and 213, a valve member 214, a pressurizing port 215, and a repulsion member 216. The port 211 is connected to the first gas supply line 111, the port 212 is connected to the second gas supply line 121, and the port 213 is connected to the connection line 130. The valve member 214 is configured to move between a first position and a second position. At the first position, the port 212 and the port 213 are disconnected from each other and the port 211 and the port 213 are connected with each other. At the second position, the port 211 and the port 213 are disconnected from each other and the port 212 and the port 213 are connected with each other. The pressurizing port 215 is configured to provide an opening force, or driving force, from the first position to the second position to the valve member 214 in accordance with a gas pressure for driving the switching valve 210 (the "driving gas pressure"). The repulsion member 216 is configured to provide the valve member 214 with a closing force, or repulsive force, from the second position to the first position by a spring or compressed gas.

The pressurizing line 220 is configured to transmit the driving gas pressure to the pressurizing port 215. The drive valve 230 is configured to change the driving gas pressure, thereby switching between a state in which the valve member 214 is at the second position (hereinafter referred to as "drive state") and a state in which the valve member 214 is at the first position (Hereinafter, it is referred to as "non-drive state"). For example, the drive valve 230 is an electromagnetic valve of an explosion-proof type and is configured to connect the gas supply source 140 and the pressurizing line 220 in the drive state and open the pressurizing line 220 to the outside in the non-drive state. As an example, the drive valve 230 includes ports 231, 232, and 236, a valve member 233, a solenoid 234, and current limiting circuitry 235.

The port 231 is connected to the gas supply source 140, the port 232 is connected to the pressurizing line 220, and the port 236 is open. The valve member 233 is configured to move between a drive position at which the port 232 is disconnected from the port 236 and connected to the port 231 and a non-drive position at which the port 232 is disconnected from the port 231 and connected to the port 236. The solenoid 234 is configured to move the valve member 233 in accordance with a driving current. The current limiting circuitry 235 is configured to limit the driving current to an upper limit value for explosion protection. Other example configurations of the gas supply pressure changing unit 200 in which the gas supply pressure can be changed between the normal pressure and the scavenging pressure include a gas supply pressure changing unit which is formed by a single electromagnetic valve, and therefore may not include both the switching valve 210 and the drive valve 230.

Furthermore, the gas supply pressure changing unit 200 may comprise a valve that is configured to change the gas supply pressure by adjusting an opening degree of the gas supply line of a single system. In some examples, the gas supply line 100 may not include the first gas supply line 110 and the second gas supply line 120, and the gas supply line 100 may instead include the gas supply line of at least a single system between the gas supply source 140 and the gas supply pressure changing unit 200.

The exhaust line 300 is configured to exhaust the gas from the housing space 51. For example, the exhaust line 300 includes an exhaust line 310, pressure switches 320 and 330, and a flow switch 340. The exhaust line 310 is configured to guide the gas from the inside of the housing space 51 to the outside of the housing space 51.

The pressure switches 320 and 330 are configured to be switched on and off by a non-electrically driven drive mechanism according to the pressure in the exhaust line 310. For example, the pressure switch 320 is configured to be switched on and off so that in a case where the pressure in the exhaust line 310 exceeds a first threshold value, the pressure switch 320 transitions to an on state. On the other hand, in a case where the pressure in the exhaust line 310 is lower than the first threshold value, the pressure switch 320 transitions to an off state. The first threshold value is, for example, a lower limit value preset for the normal operation. The pressure switch 330 is configured to be switched on and off so that in a case where the pressure in the exhaust line 310 exceeds a second threshold value, the pressure switch 330 transitions to an on state. Additionally, in a case where the pressure in the exhaust line 310 is lower than the second threshold value, the pressure switch 330 transitions to an off state. The second threshold value is, for example, a lower limit value preset for the scavenging operation and is greater than the first threshold value.

The flow switch 340 is configured to be switched on and off by a non-electrically driven drive mechanism according to a gas flow rate in the exhaust line 310. For example, the flow switch 340 is configured to be switched on and off so that in a case where the gas flow rate in the exhaust line 310 exceeds a third threshold value, the flow switch 340 transitions to an on state, and in a case where the gas flow rate in the exhaust line 310 is lower than the third threshold value, the flow switch 340 transitions to an off state. The third threshold value is preset, for example, so as to be equal to or lower than the gas flow rate during the scavenging operation.

The opening/closing unit 400 is configured to switch between opening and closing of the exhaust line 300 in accordance with the gas supply pressure by the gas supply line 100. In some examples, the exhaust line 300 is opened in response to an increase in the gas supply pressure by the gas supply line 100, and the exhaust line 300 is closed in response to a decrease in the gas supply pressure by the gas supply line 100. The opening/closing unit 400 may be configured to switch between opening and closing of the exhaust line 300 so that in a case where the gas supply pressure is equal to or higher than the scavenging pressure, the exhaust line 300 is opened, and in a case where the gas supply pressure is equal to or lower than the normal pressure, the exhaust line 300 is closed. As an example, the opening/closing unit 400 includes an on-off valve 410 (exhaust valve) and a pressurizing line 420.

The on-off valve 410 may comprise a non-electrically driven and gas pressure driven type valve that is configured to switch between opening and closing of the exhaust line 300 in accordance with the gas supply pressure by the gas supply line 100. For example, the on-off valve 410 is provided at the end of the exhaust line 310 and is configured to switch between opening and closing. In a case where the gas supply pressure is equal to or higher than the scavenging pressure, the end of the exhaust line 310 is opened, and in a case where the gas supply pressure is equal to or lower than the normal pressure, the end of the exhaust line 310 is closed. As an example, the on-off valve 410 includes ports 411 and 412, a valve member 413, a pressurizing port 414, and a repulsion member 415.

The port 411 is connected to the end of the exhaust line 310, and the port 412 is open. The valve member 413 is configured to move between a closed position at which the port 411 and the port 412 are disconnected from each other and an opened position at which the port 411 and the port 412 are connected with each other. The pressurizing port 414 is configured to give the valve member 413 an opening force, or driving force, from the closed position to the opened position in accordance with the gas supply pressure by the gas supply line 100.

The repulsion member 415 is configured to give the valve member 413 a closing force, or repulsive force, from the opened position to the closed position by a spring or compressed gas. The closing force by the repulsion member 415 is set to a value that is greater than a normal opening force given to the valve member 413 by the pressurizing port 414 in accordance with the normal pressure and lower than an increased opening force given to the valve member 413 by the pressurizing port 414 in accordance with the scavenging pressure. Therefore, the valve member 413 is arranged at the closed position in a case where the gas supply pressure by the gas supply line 100 is the normal pressure, and the valve member 413 is arranged at the opened position in a case where the gas supply pressure by the gas supply line 100 is the scavenging pressure. Accordingly, the exhaust line 300 is closed in the normal operation, and the exhaust line 300 is opened in the scavenging operation. Furthermore, in a case where the pressure in the housing space 51 abnormally increases during the normal operation, the exhaust line 300 is opened in accordance with the pressure in the housing space 51 reaching the scavenging pressure. As a result, the pressure within the housing space 51 may be maintained at a pressure which is not excessive.

The pressurizing line 420 branches from the connection line 130 and is connected to the on-off valve 410 and is configured to transmit the gas supply pressure from the gas supply line 100 to the pressurizing port 414.

The internal pressure controller 500 is configured to control the gas supply pressure changing unit 200 so as to change the gas supply pressure from the gas supply line 100 to the housing space 51, and to detect a pressure abnormality in the housing space 51, based on the gas flow rate in the exhaust line 300. For example, the internal pressure controller 500 includes a gas supply pressure changing unit 511, an abnormality detecting unit 512, an abnormality notifying unit 513, and a switch state monitoring unit 514 as functional configurations (hereinafter referred to as "functional modules").

The gas supply pressure changing unit 511 is configured to change the gas supply pressure from the gas supply line 100 to the housing space 51 so that the internal pressure adjustment system 3 sequentially performs the scavenging operation and the normal operation. The switch state monitoring unit 514 is configured to monitor states of the pressure switches 320 and 330 and the flow switch 340.

The abnormality detecting unit 512 is configured to detect the pressure abnormality in the housing space 51, based on the gas flow rate of the exhaust line 310. For example, the abnormality detecting unit 512 is configured to detect the pressure abnormality in the housing space 51 in accordance with the switch state monitoring unit 514 detecting that the flow switch 340 has transitioned to the on state during the normal operation. Furthermore, the abnormality detecting unit 512 may detect the pressure abnormality in the housing space 51 in accordance with the switch state monitoring unit 514 detecting that the flow switch 340 has transitioned to the off state during the scavenging operation.

The abnormality detecting unit 512 may detect the pressure abnormality in the housing space 51 based additionally on the internal pressure of the exhaust line 310. For example, the abnormality detecting unit 512 is configured to detect the pressure abnormality in the housing space 51 in accordance with the switch state monitoring unit 514 detecting that the pressure switch 320 has transitioned to the off state during the normal operation. Furthermore, the abnormality detecting unit 512 may detect the pressure abnormality in the housing space 51 in accordance with the switch state monitoring unit 514 detecting that the pressure switch 330 has transitioned to the off state during the scavenging operation.

The abnormality notifying unit 513 is configured to notify an administrator that an abnormality has been detected by the abnormality detecting unit 512. For example, the abnormality notifying unit 513 is configured to notify the abnormality by a display device such as a warning light or a monitor. The abnormality notifying unit 513 may notify the abnormality by an acoustic device such as a buzzer.

Figure 2:
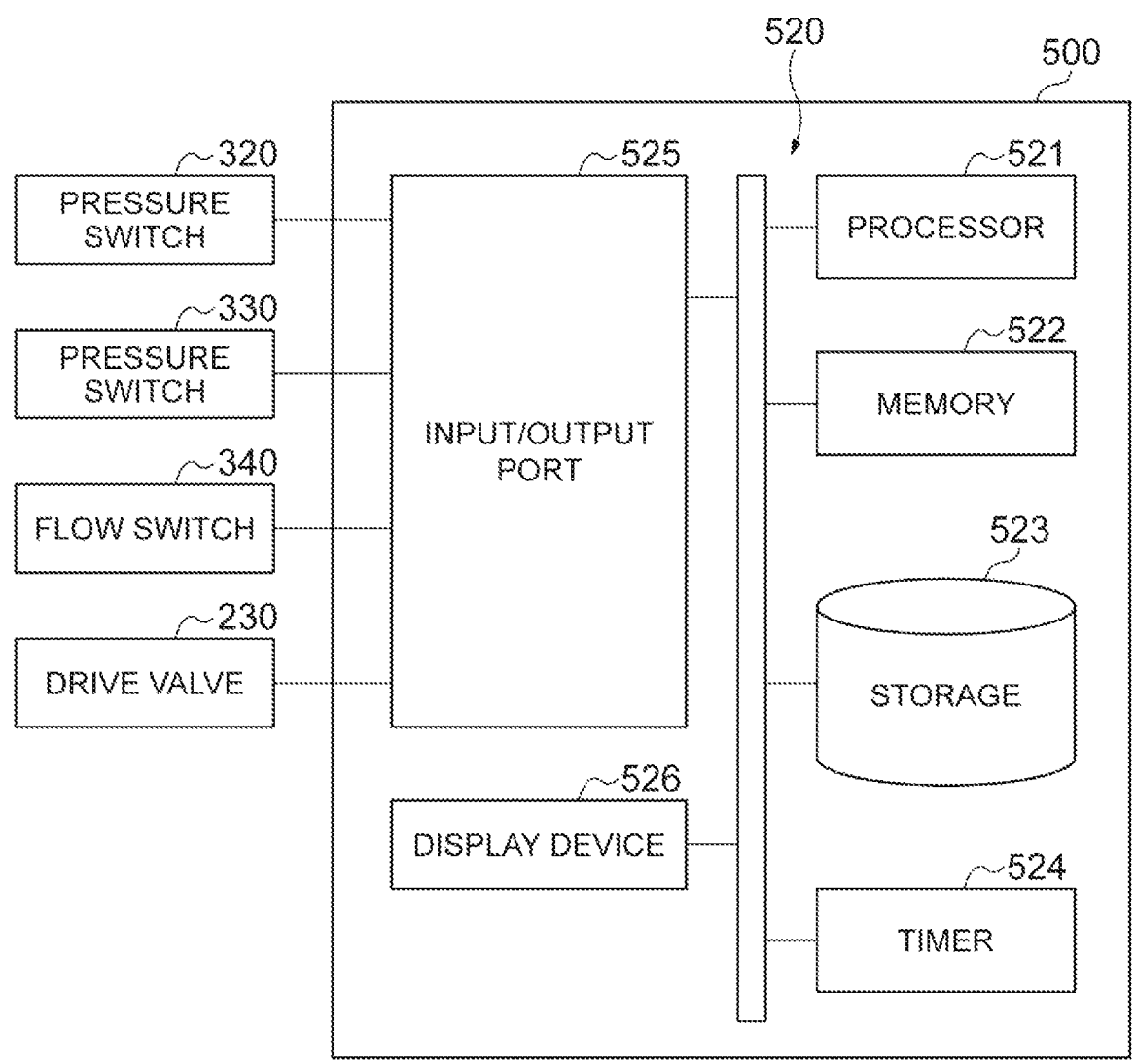
FIG. 2 is a block diagram illustrating an example of a hardware configuration of an internal pressure controller.

FIG. 2 is a block diagram illustrating an example hardware configuration of the internal pressure controller 500. As illustrated in FIG. 2, the internal pressure controller 500 may comprise circuitry 520, including one or a plurality of processors 521, a memory 522, a storage 523, a timer 524, an input/output port 525, and a display device 526. The storage 523 includes a computer-readable storage medium such as a nonvolatile semiconductor memory. The storage 523 is configured to store a program which may be executed to cause the internal pressure controller 500 to control the gas supply pressure changing unit 200 so as to change the gas supply pressure from the gas supply line 100 to the housing space 51. Additionally, the internal pressure controller 500 may be caused to detect the pressure abnormality in the housing space 51, based on the gas flow rate in the exhaust line 300. For example, the storage 523 is configured to store a program for configuring the functional modules of the internal pressure controller 500 described above.

The memory 522 may be configured to temporarily store the program loaded from the storage medium of the storage 523 and a calculation result by the processor 521. The processor 521 configures each functional module of the internal pressure controller 500 by executing the program in cooperation with the memory 522. The timer 524 measures elapsed time by counting clock pulses having a predetermined period according to instructions from the processor 521. The input/output port 525 is configured to input and output electrical signals to and from the drive valve 230, the pressure switches 320 and 330, and the flow switch 340 according to instructions from the processor 521. The display device 526 includes, for example, a liquid crystal monitor and a warning lamp that may be used for displaying information to a user.

The functions of the internal pressure controller 500 may be configured by a program, as discussed above. In other examples, at least a part of functions thereof may be configured by a dedicated logic circuit or an application specific integrated circuit (ASIC) in which the dedicated logic circuit is integrated.

Internal Pressure Adjustment Method

An example internal pressure adjustment procedure executed by the internal pressure controller 500 will be described with reference to FIG. 3. The procedure may include changing the gas supply pressure from the gas supply line 100 to the housing space 51 and detecting the pressure abnormality in the housing space 51, based on the gas flow rate in the exhaust line 300.

Figure 3:
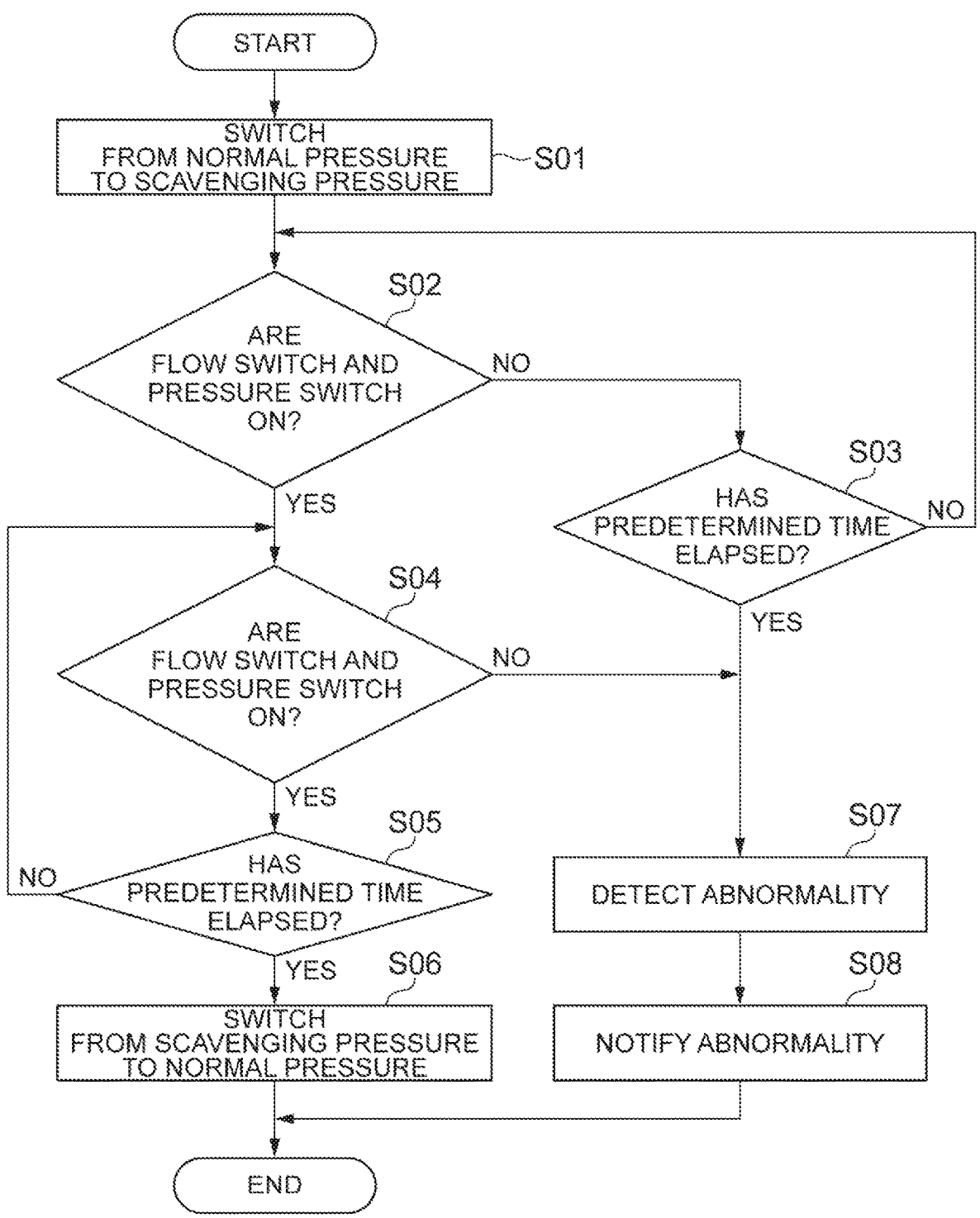
FIG. 3 is a flowchart illustrating an example of a scavenging procedure.

FIG. 3 is a flowchart illustrating an example scavenging procedure in which the gas supply pressure is changed. As illustrated in FIG. 3, the internal pressure controller 500 first executes operation S01. In operation S01, the gas supply pressure changing unit 511 controls the gas supply pressure changing unit 200 so as to switch the gas supply pressure supplied by the gas supply line 100 to the housing space 51, from the normal pressure to the scavenging pressure. For example, the gas supply pressure changing unit 511 changes the supply current being provided to the solenoid 234 in order to switch the drive valve 230 from the non-drive state to the drive state. In response to the transition to the drive state, the switching valve 210 switches the first gas supply state to the second gas supply state. As a result, the gas supply is provided to the housing space 51 at the scavenging pressure. When the gas supply pressure is switched to the scavenging pressure, the exhaust line 300 is opened by the on-off valve 410 which causes gas to be exhausted from the inside of the housing space 51 to the outside of the housing space 51.

Next, the internal pressure controller 500 executes operation S02. In operation S02, the gas supply pressure changing unit 511 confirms whether the switch state monitoring unit 514 has detected that both the pressure switch 330 and the flow switch 340 have transitioned to the on state.

In operation S02, in response to determining that the switch state monitoring unit 514 has not detected that both the pressure switch 330 and the flow switch 340 have transitioned to the on state, the internal pressure controller 500 executes operation S03. In operation S03, the switch state monitoring unit 514 confirms whether a predetermined period of time has elapsed since the execution of operation SOL In operation S03, in response to determining that the predetermined period of time has not elapsed since the execution of operation S01, the internal pressure controller 500 returns processing to operation S02. Thereafter, the internal pressure controller 500 repeats the execution of steps S02 and S03 until both the pressure switch 330 and the flow switch 340 transition to the on state or until the predetermined period of time elapses since the execution of operation S01.

When it is determined in operation S02 that the switch state monitoring unit 514 has detected that both the pressure switch 330 and the flow switch 340 have transitioned to the on state, the internal pressure controller 500 executes operation S04. In operation S04, the switch state monitoring unit 514 confirms whether the switch state monitoring unit 514 has detected that both the pressure switch 330 and the flow switch 340 remain in the on state.

In operation S04, in response to determining that the switch state monitoring unit 514 has detected that both the pressure switch 330 and the flow switch 340 remain in the on state, the internal pressure controller executes operation S05. In operation S05, the switch state monitoring unit 514 confirms whether a predetermined period of time has elapsed since it was detected that the pressure switch 330 and the flow switch 340 were switched to the on state in operation S02.

In operation S05, in response to determining that the predetermined period of time has not elapsed, the internal pressure controller 500 returns the processing to operation S04. Thereafter, the confirmation of the pressure switch 330 and the flow switch 340 is continued until it is determined in operation S05 that the predetermined period of time has elapsed.

In operation S05, in response to determining that the predetermined period of time has elapsed, the internal pressure controller 500 executes operation S06. In operation S06, the gas supply pressure changing unit 511 controls the gas supply pressure changing unit 200 so as to switch the gas supply pressure supplied from the gas supply line 100 to the housing space 51, from the scavenging pressure to the no/mai pressure. For example, the gas supply pressure changing unit 511 changes the supply current being provided to the solenoid 234 in order to switch the drive valve 230 from the drive state to the non-drive state. In response to the transition to the drive state, the switching valve 210 switches the second gas supply state to the first gas supply state. As a result, the gas supply is provided to the housing space 51 at the normal pressure. When the gas supply pressure is switched to the normal pressure, the exhaust line 300 is closed by the on-off valve 410 which prohibits gas from being exhausted from the inside of the housing space 51 to the outside of the housing space 51. This completes the scavenging procedure. Thereafter, the internal pressure adjustment system 3 performs the normal operation.

When it is determined in operation S03 that the predetermined period of time has elapsed since the execution of operation S01 or when it is determined in operation S04 that the switch state monitoring unit 514 has not detected that both the flow switch 340 and the pressure switch 330 have transitioned to the on state, the internal pressure controller 500 executes steps S07 and S08. In operation S07, the abnormality detecting unit 512 detects the pressure abnormality in the housing space 51. In operation S08, the abnormality notifying unit 513 notifies the pressure abnormality in the housing space 51. As a result, the scavenging procedure is stopped.

Figure 4:
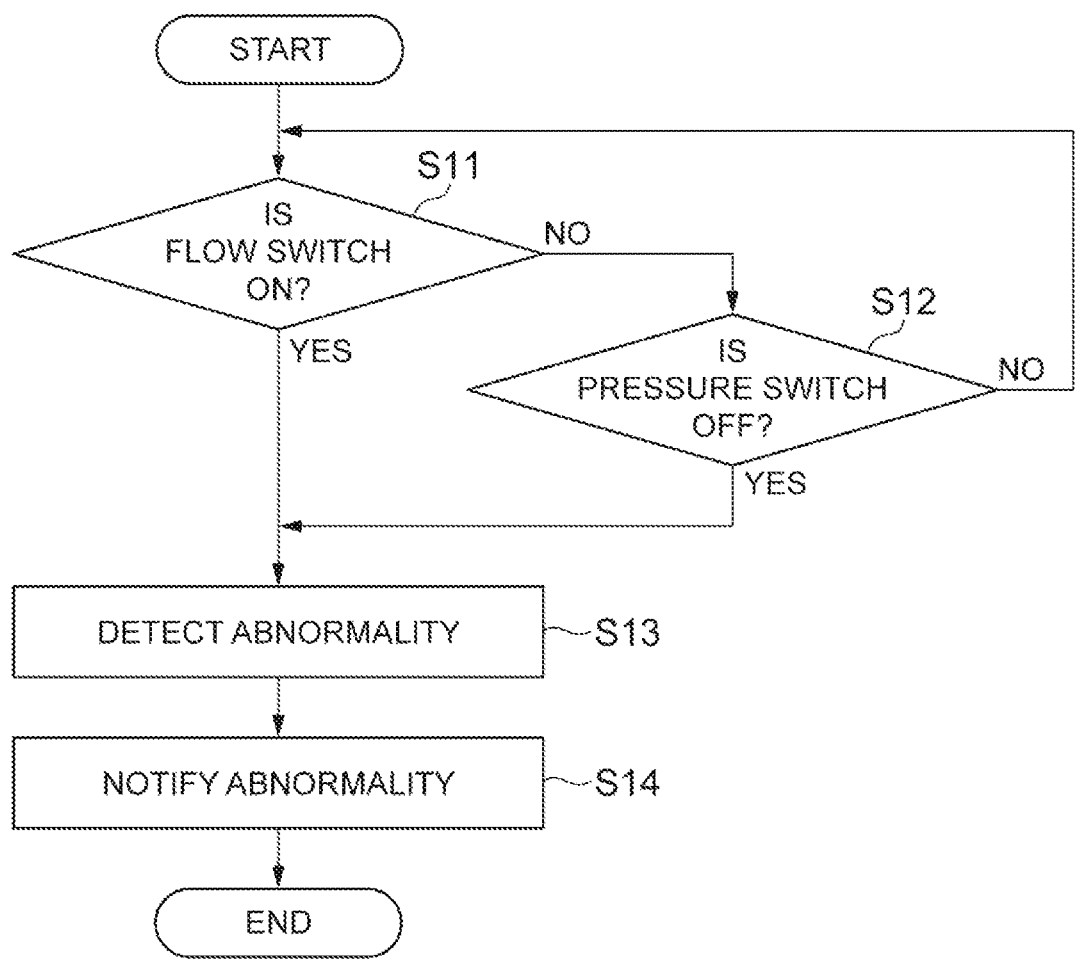
FIG. 4 is a flowchart illustrating an example of an internal pressure abnormality detection procedure.

FIG. 4 is a flowchart illustrating an example procedure of detecting the pressure abnormality in the housing space 51 during the normal operation. As illustrated in FIG. 4, the internal pressure controller 500 first executes operation S11. In operation S11, the abnormality detecting unit 512 confirms whether the switch state monitoring unit 514 has detected that the flow switch 340 has transitioned to the on state.

When it is determined in operation S11 that the switch state monitoring unit 514 has not detected that the flow switch 340 has transitioned to the on state, the internal pressure controller 500 executes operation S12. In operation S12, the abnormality detecting unit 512 confirms whether the switch state monitoring unit 514 has detected that the pressure switch 320 has transitioned to the off state.

When it is determined in operation S12 that the switch state monitoring unit 514 has not detected that the pressure switch 320 has transitioned to the off state, the internal pressure controller 500 returns the processing to operation S11. Thereafter, the state confirmation of the flow switch 340 and the pressure switch 320 is repeated until the flow switch 340 transitions to the on state or the pressure switch 320 transitions to the off state.

When it is determined in operation S11 that the switch state monitoring unit 514 has detected that the flow switch 340 has transitioned to the on state or when it is determined in operation S12 that the switch state monitoring unit 514 has detected that the pressure switch 320 has transitioned to the off state, the internal pressure controller 500 executes steps S13 and S14. In operation S13, the abnormality detecting unit 512 detects the pressure abnormality in the housing space 51. In operation S14, the abnormality notifying unit 513 notifies the pressure abnormality in the housing space 51. This completes the pressure abnormality detection procedure. In some examples, the order of the state confirmation of the flow switch 340 in operation Si 1 and the state confirmation of the pressure switch 320 in operation S12 is interchangeable.

Figure 5:
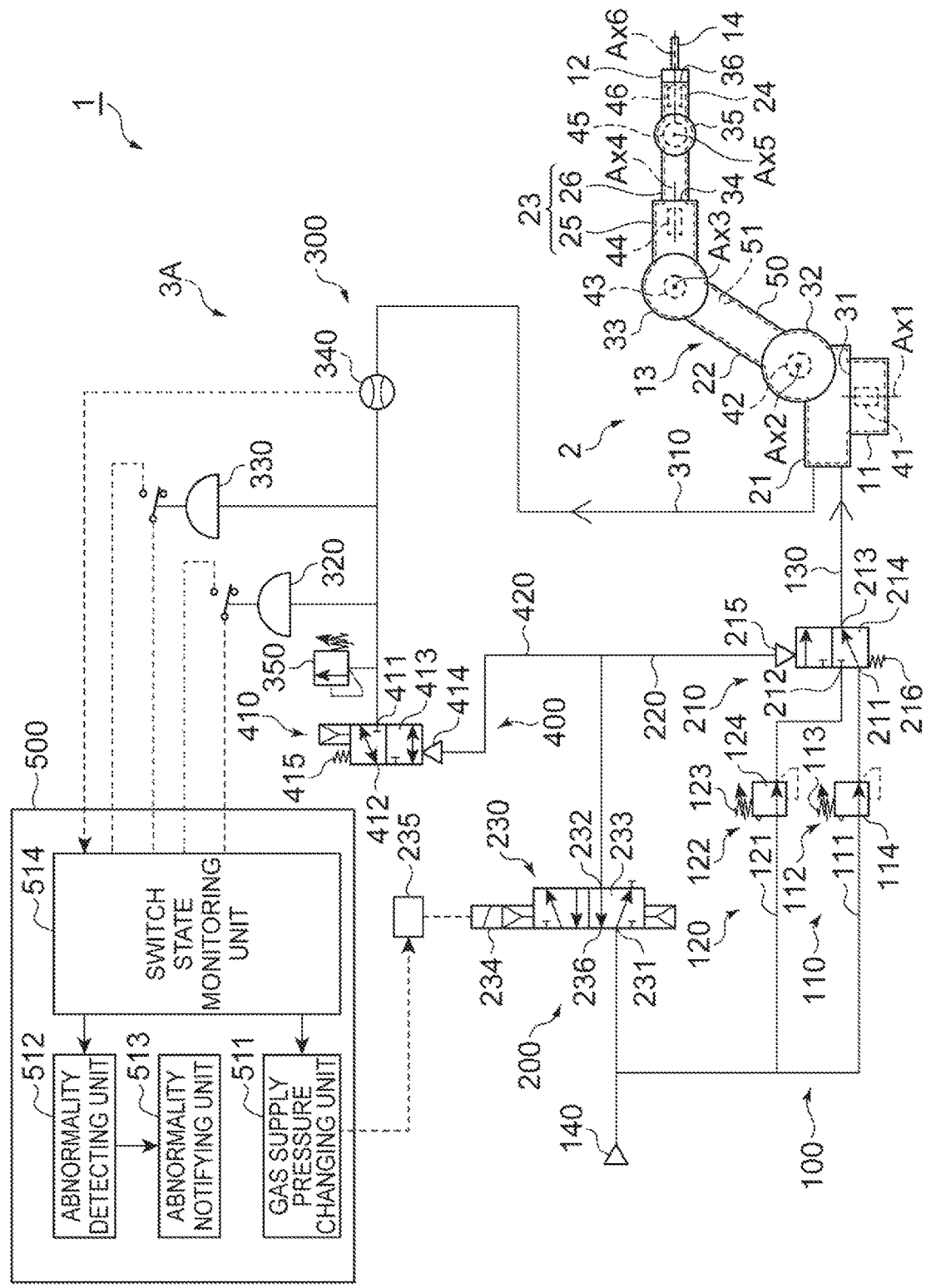
FIG. 5 is a schematic diagram illustrating an example modification of the robot system.

The example pressure abnormality detection procedure described above can be applied to systems having different configurations of the opening/closing unit 400 as compared to the internal pressure adjustment system 3. For example, the internal pressure adjustment system 3A illustrated in FIG. 5 differs from the internal pressure adjustment system 3 in terms of the piping path of the pressurizing line 420 of the opening/closing unit 400. The pressurizing line 420 of the internal pressure adjustment system 3A branches from the pressurizing line 220 and is connected to the on-off valve 410. Even in this configuration, the gas supply pressure from the gas supply source 140 is transmitted to the pressurizing port 414 of the on-off valve 410 in accordance with the drive valve 230 transitioning to the drive state, and the exhaust line 300 is opened so that the gas may be exhausted during the scavenging operation.

However, in a case where the pressure in the housing space 51 abnormally increases during the normal operation, the exhaust line 300 may remain closed even if the pressure in the housing space 51 reaches the scavenging pressure. Accordingly, the exhaust line 300 of the internal pressure adjustment system 3A may include a pressure adjustment valve 350. The pressure adjustment valve 350 is configured to open the exhaust line 310 in response to an increase in a gas pressure in the exhaust line 310. For example, the pressure adjustment valve 350 is connected to the exhaust line 310 and guides gas in the exhaust line 310 to the outside of the exhaust line 310 in accordance with the pressure of the exhaust line 310 exceeding a fourth threshold value. As a result, the pressure within the housing space 51 may be maintained at a pressure which is not excessive.

Figure 6:
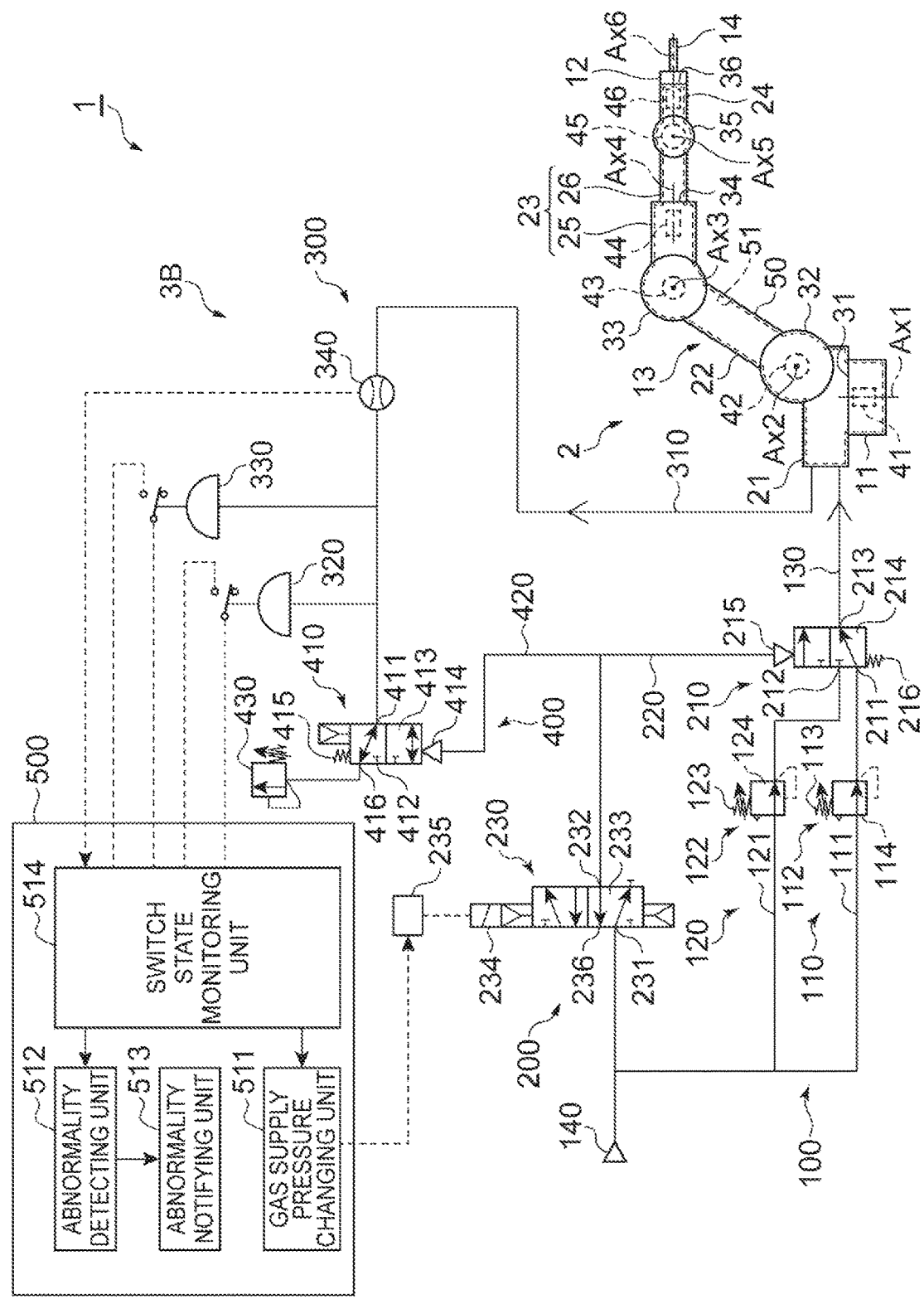
FIG. 6 is a schematic diagram illustrating another example modification of the robot system.

Another example internal pressure adjustment system 3B is illustrated in FIG. 6. In the internal pressure adjustment system 3B, the opening/closing unit 400 includes a pressure adjustment valve 430, instead of the exhaust line 300 having the pressure adjustment valve 350 as described for the internal pressure adjustment system 3A. As with the pressure adjustment valve 350, the pressure adjustment valve 430 also guides the gas in the exhaust line 310 to the outside of the exhaust line 310 in accordance with the pressure of the exhaust line 310 exceeding the fourth threshold value.

The on-off valve 410 of the internal pressure adjustment system 3B further includes a port 416 in addition to the ports 411 and 412. The port 416 is connected to the pressure adjustment valve 430. In a case where the pressurizing port 414 is at the closed position, the port 416 is connected to the port 411 and in a case where the pressurizing port 414 is at the opened position, the port 416 is disconnected from the port 411. Accordingly, in normal operation, the pressure of the exhaust line 310 may be transmitted to the pressure adjustment valve 430. Meanwhile, in the scavenging operation, the pressure adjustment valve 430 is disconnected from the exhaust line 310.

In both of the example internal pressure adjustment systems 3A and 3B, when the pressure in the housing space 51 abnormally increases, the gas in the exhaust line 310 is guided to outside of the exhaust line 310. Therefore, the gas flow rate in the exhaust line 310 increases and the flow switch 340 transitions to the on state. Accordingly, the above-described pressure abnormality detection procedure performed by the flow switch 340 may be applied to both the internal pressure adjustment systems 3A and 3B.

In some examples, the internal pressure adjustment system 3 includes the gas supply line 100, the gas supply pressure changing unit 200, the exhaust line 300, the on-off valve 410 of a gas pressure driven type. The gas supply line 100 is configured to supply the incombustible gas to the housing space 51 of the robot 2, and the gas supply pressure changing unit 200 is configured to change the gas supply pressure of the incombustible gas by the gas supply line 100. Additionally, the exhaust line 300 is configured to exhaust the gas from the housing space 51. The on-off valve 410 of a gas pressure driven type is configured to switch between opening and closing of the exhaust line 300 in accordance with the gas supply pressure. Accordingly, the exhaust line is opened in response to an increase in the gas supply pressure, and the exhaust line 300 is closed in response to a decrease in the gas supply pressure.

In a system that adjusts an internal pressure of a robot with incombustible gas, an exhaust line may be alternately opened and closed in accordance with a gas supply state in the robot. For example, during scavenging that replaces gas in the robot with the incombustible gas, the exhaust line is opened in order to exhaust the gas in the robot. On the other hand, the exhaust line is closed during normal gas supply in order to maintain the inside of the robot at a high pressure, such as by continuously supplying a small amount of the incombustible gas. Furthermore, even during the normal gas supply, the exhaust unit may be opened in a case where the pressure in the robot abnormally increases. In the example internal pressure adjustment system 3, in which the on-off valve 410 of a gas pressure driven type is connected to a gas supply path by the gas supply line 100, the exhaust line 300 may therefore be opened and closed in accordance with a gas supply state and the exhaust line 300 can be opened in response to an abnormal increase in the pressure in the robot 2. Therefore, the internal pressure within a robot may be efficiently controlled.

The gas supply pressure changing unit 200 may change the gas supply pressure between the normal pressure for operating the robot 2 and the scavenging pressure which is higher than the normal pressure. The on-off valve 410 may switch between the opening and closing of the exhaust line 300 so that in a case where the gas supply pressure is equal to or higher than the scavenging pressure, the exhaust line 300 is opened and in a case where the gas supply pressure is equal to or lower than the normal pressure, the exhaust line 300 is closed. Accordingly, the on-off valve 410 may be configured to open the exhaust line 300 during the scavenging and to close the exhaust line 300 during the normal gas supply.

The gas supply line 100 may include the first gas supply line 110 configured to supply the incombustible gas at the normal pressure and the second gas supply line 120 configured to supply the incombustible gas at the scavenging pressure. The gas supply pressure changing unit 200 may include the switching valve 210 configured to switch between the first gas supply state and the second gas supply state. In the first gas supply state, the incombustible gas is supplied to the housing space 51 by the first gas supply line 110. In the second gas supply state, the incombustible gas is supplied to the housing space 51 by the second gas supply line 120. Therefore, the internal pressure within a robot may be efficiently controlled.

The switching valve 210 is of a gas pressure driven type and the gas supply pressure changing unit 200 may further include a drive valve 230 configured to change the gas pressure for driving the switching valve 210. In some examples such as where the robot 2 is arranged in a working space where explosion protection is required, the switching valve 210 such as a gas pressure driven type may be arranged in the same working space. As a result, a flow path length from the switching valve 210 to the robot 2 (hereinafter referred to as "gas supply flow path length") can be shortened to facilitate the efficient control of internal pressure within a robot. The opening of the exhaust line 300 during the scavenging may be started at a time when the pressure in the robot 2 has sufficiently increased in accordance with the gas supply at the scavenging pressure. According to the shortening of the gas supply flow path length, a time lag between an increase in the gas supply pressure and an increase in pressure in the robot 2 is reduced. Therefore, the shortening of the gas supply flow path length may optimize the timing when the opening of the exhaust line 300 is started during the scavenging.

The drive valve 230 may be an electromagnetic valve of an explosion-proof type. Accordingly, the drive valve 230 may also be arranged in the working space to facilitate the efficient control of internal pressure within a robot.

The internal pressure adjustment system 3 may further include the abnormality detecting unit 512 that detects the pressure abnormality in the housing space 51, based on the gas flow rate of the exhaust line 300. In this case, with a structure in which a gas flow rate meter is arranged in an exhaust flow path, a pressure abnormality in the robot 2 may be detected.

The abnormality detecting unit 512 may detect the pressure abnormality in the housing space 51 based additionally on the internal pressure of the exhaust line 300. In some examples, the pressure abnormality in the robot 2 may more accurately be detected by being based on both the gas flow rate of the exhaust line and the internal pressure of the exhaust flow path.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. An internal pressure adjustment system comprising:
   a switching valve configured to change a gas supply pressure of an incombustible gas output from an output port of the switching valve to an internal space of a robot;
   a connection line fluidly coupling the output port to the internal space of the robot;
   an exhaust line configured to exhaust gas from the internal space; and
   a gas-operated exhaust valve fluidly coupled to the connection line by a pressurizing line configured to receive a portion of the incombustible gas output from the output port, the exhaust valve configured to open the exhaust line in response to an increase in the gas supply pressure and to close the exhaust line in response to a decrease in the gas supply pressure.

2. The internal pressure adjustment system according to claim 1, wherein the switching valve is configured to change the gas supply pressure from a normal pressure for operating the robot to a scavenging pressure which is higher than the normal pressure, and
   wherein the exhaust valve is configured to keep the exhaust line opened while the gas supply pressure is equal to or higher than the scavenging pressure, and to keep the exhaust line closed while the gas supply pressure is equal to or lower than the normal pressure.

3. The internal pressure adjustment system according to claim 2, wherein the exhaust valve is configured to be driven by the gas supply pressure in the pressurizing line.

4. The internal pressure adjustment system according to claim 3, wherein the exhaust valve comprises:
   a valve member configured to move between a closed position at which the exhaust line is closed and an opened position at which the exhaust line is opened; and
   a pressurizing port connected to the pressurizing line and configured to provide the valve member with an opening force from the closed position to the opened position in accordance with the gas supply pressure.

5. The internal pressure adjustment system according to claim 4, wherein the pressurizing port is configured to provide the valve member with a normal opening force corresponding to the normal pressure, and to provide an increased opening force corresponding to the scavenging pressure, and
   wherein the exhaust valve further comprises a repulsion member configured to provide the valve member with a closing force from the opened position to the closed position, the closing force being greater than the normal opening force and lower than the increased opening force.

6. The internal pressure adjustment system according to claim 2, further comprising:
   a first gas supply line fluidly coupled to the switching valve and configured to supply incombustible gas at the normal pressure; and
   a second gas supply line fluidly coupled to the switching valve and configured to supply the incombustible gas at the scavenging pressure,
   wherein the switching valve is configured to switch between a first gas supply state in which the first gas supply line is connected to the connection line and a second gas supply state in which the second gas supply line is connected to the connection.

7. The internal pressure adjustment system according to claim 6, wherein the switching valve is a gas-operated valve driven by a switching gas pressure, and
   wherein the internal pressure adjustment system further comprises a drive valve configured to change the switching gas pressure.

8. The internal pressure adjustment system according to claim 2, further comprising a pressure adjustment valve configured to open the exhaust line in response to an increase in a gas pressure in the exhaust line.

9. The internal pressure adjustment system according to claim 1, further comprising an abnormality detecting unit configured to detect a pressure abnormality in the internal space based on a gas flow rate in the exhaust line.

10. The internal pressure adjustment system according to claim 9, wherein the abnormality detecting unit detects the pressure abnormality in the internal space further based on an internal pressure of the exhaust line.

11. A robot system comprising:
the internal pressure adjustment system according to claim 1; and
the robot.

12. An internal pressure adjustment system comprising:
a gas-operated switching valve configured to change a gas supply pressure of an incombustible gas output from an output port to an internal space of a robot, wherein the switching valve is driven by a switching gas pressure;
a connection line fluidly coupling the output port to the internal space of the robot;
an exhaust line configured to exhaust gas from the internal space;
an exhaust valve fluidly coupled to the connection line and configured to receive a portion of the incombustible gas output from the output port, the exhaust valve configured to open the exhaust line in response to an increase in the gas supply pressure and to close the exhaust line in response to a decrease in the gas supply pressure; and
a drive valve configured to change the switching gas pressure provided to the switching valve.

13. The internal pressure adjustment system according to claim 12, wherein the drive valve is an explosion-proof electromagnetic valve.

14. The internal pressure adjustment system according to claim 12, further comprising:
a first gas supply line fluidly coupled to the switching valve and configured to supply incombustible gas at a normal pressure for operating the robot; and
a second gas supply line fluidly coupled to the switching valve and configured to supply the incombustible gas at the scavenging pressure,
wherein the switching valve is configured to switch between a first gas supply state in which the first gas supply line is fluidly coupled to the connection line and a second gas supply state in which the second gas supply line is fluidly coupled to the connection line.

15. The internal pressure adjustment system according to claim 14, wherein the switching valve comprises:
a valve member configured to move between a first position at which the first gas supply line is fluidly coupled to the connection line and a second position at which the second gas supply line is fluidly coupled to the connection line; and
a pressurizing port configured to provide the valve member with a switching force from the first position to the second position in accordance with the switching gas pressure.

16. The internal pressure adjustment system according to claim 15, wherein the first gas supply line and the second gas supply line are connected to an incombustible gas source, and
wherein the drive valve is configured to connect the incombustible gas source to the pressurizing port in the second gas supply state.

17. The internal pressure adjustment system according to claim 12, wherein the switching valve is configured to change the gas supply pressure from a normal pressure for operating the robot to a scavenging pressure which is higher than the normal pressure, and
wherein the exhaust valve is configured to keep the exhaust line opened while the gas supply pressure is equal to or higher than the scavenging pressure, and to keep the exhaust line closed while the gas supply pressure is equal to or lower than the normal pressure.

18. The internal pressure adjustment system according to claim 17, wherein the exhaust valve comprises:
a valve member configured to move between a closed position at which the exhaust line is closed and an opened position at which the exhaust line is opened; and
a pressurizing port connected to the pressurizing line and configured to provide the valve member with an opening force from the closed position to the opened position in accordance with the gas supply pressure.

19. The internal pressure adjustment system according to claim 18, wherein the pressurizing port is configured to provide the valve member with a normal opening force corresponding to the normal pressure, and to provide an increased opening force corresponding to the scavenging pressure, and
wherein the exhaust valve further comprises a repulsion member configured to provide the valve member with a closing force from the opened position to the closed position, the closing force being greater than the normal opening force and lower than the increased opening force.

20. The internal pressure adjustment system according to claim 12, further comprising an abnormality detecting unit configured to detect a pressure abnormality in the internal space based on a gas flow rate in the exhaust line,
wherein the abnormality detecting unit detects the pressure abnormality in the internal space further based on an internal pressure of the exhaust line.

* * * * *